(12) United States Patent
Folgueira Baltar et al.

(10) Patent No.: US 10,458,723 B2
(45) Date of Patent: Oct. 29, 2019

(54) EVAPORATOR

(71) Applicant: BORGWARNER EMISSIONS SYSTEMS SPAIN, S.L.U., Vigo, Pontevedra (ES)

(72) Inventors: Adrián Folgueira Baltar, Lugo (ES); José Antonio Grande Fernández, Pontevedra (ES); Manuel Diéguez, Pontevedra (ES)

(73) Assignee: BORGWARNER EMISSIONS SYSTEMS SPAIN, S.L.U., Vigo, Pontevedra (ES)

( * ) Notice: Subject to any disclaimer, the term of this patent is extended or adjusted under 35 U.S.C. 154(b) by 103 days.

(21) Appl. No.: 15/334,806

(22) Filed: Oct. 26, 2016

(65) Prior Publication Data

US 2017/0122676 A1 May 4, 2017

(30) Foreign Application Priority Data

Oct. 28, 2015 (EP) .................................... 15382534

(51) Int. Cl.
*F28D 21/00* (2006.01)
*F28D 7/10* (2006.01)
(Continued)

(52) U.S. Cl.
CPC ......... *F28D 21/0003* (2013.01); *F28D 7/103* (2013.01); *F28F 9/002* (2013.01);
(Continued)

(58) Field of Classification Search
CPC .... F28D 21/0003; F28D 7/103; F28D 7/1623; F28D 7/1638; F28D 7/16; F28D 1/06;
(Continued)

(56) References Cited

U.S. PATENT DOCUMENTS 2,950,092 A * 8/1960 Di Niro ..................... F28F 9/02
165/150
3,782,454 A 1/1974 Slaasted et al.
(Continued)

FOREIGN PATENT DOCUMENTS

EP 0978702 A1 2/2000
JP 2006226586 8/2006
(Continued)

OTHER PUBLICATIONS

European Search Report, dated May 4, 2016.
Korean Office Action, dated Mar. 20, 2018.

*Primary Examiner* — Jon T. Schermerhorn, Jr.
(74) *Attorney, Agent, or Firm* — Tristan A. Fuierer; Olive Law Group, PLLC

(57) ABSTRACT

The present invention is a cross-flow evaporator adapted to generate vapor from the heat of the exhaust gases from an internal combustion engine. The evaporator is constituted, among other elements, by two plates spaced from one another which contain chambers. The heat exchange tubes alternately communicate the chambers of both plates, establishing a specific path for the fluid intended to change phase. The tubes extending between the chambers of the two plates are arranged transverse to the flow of the hot gas.
This evaporator is suitable for heat recovery systems using a Rankine cycle, making use of the heat from the exhaust gases.
The invention is characterized by a special configuration of the chambers by means of caps that allow the evacuation-of the gases generated during a brazing welding in the manufacturing process.

15 Claims, 4 Drawing Sheets

(51) Int. Cl.
*F28F 9/00* (2006.01)
*F28D 7/16* (2006.01)
*F28D 7/00* (2006.01)

(52) U.S. Cl.
CPC .............. *F28D 7/0058* (2013.01); *F28D 7/16* (2013.01); *F28D 2021/0064* (2013.01); *F28F 2220/00* (2013.01); *F28F 2275/04* (2013.01)

(58) Field of Classification Search
CPC .... F28D 1/05333; F28D 1/053; F28D 7/0058; F28D 7/1692; F01N 5/00; F22B 1/1807; F28F 9/001; F28F 9/0131
See application file for complete search history.

(56) References Cited

U.S. PATENT DOCUMENTS

| | | | |
|---|---|---|---|
| 4,363,355 A * | 12/1982 | Prucyk | F28D 7/08 165/150 |
| 4,877,083 A * | 10/1989 | Saperstein | B23K 1/0012 138/94.3 |
| 5,246,062 A | 9/1993 | Meijburg | |
| 9,250,021 B2 * | 2/2016 | Kim | F24H 1/38 |
| 2008/0061160 A1 | 3/2008 | Ootomo et al. | |
| 2011/0061388 A1 | 3/2011 | Lehar et al. | |
| 2011/0185714 A1 | 8/2011 | Lohbreyer et al. | |
| 2012/0037346 A1 | 2/2012 | Kim et al. | |
| 2015/0060028 A1* | 3/2015 | Irmler | F28D 7/1638 165/157 |
| 2015/0241130 A1 | 8/2015 | Kim et al. | |

FOREIGN PATENT DOCUMENTS

| | | |
|---|---|---|
| KR | 1019980065522 | 10/1998 |
| WO | 2011048574 A2 | 4/2011 |

* cited by examiner

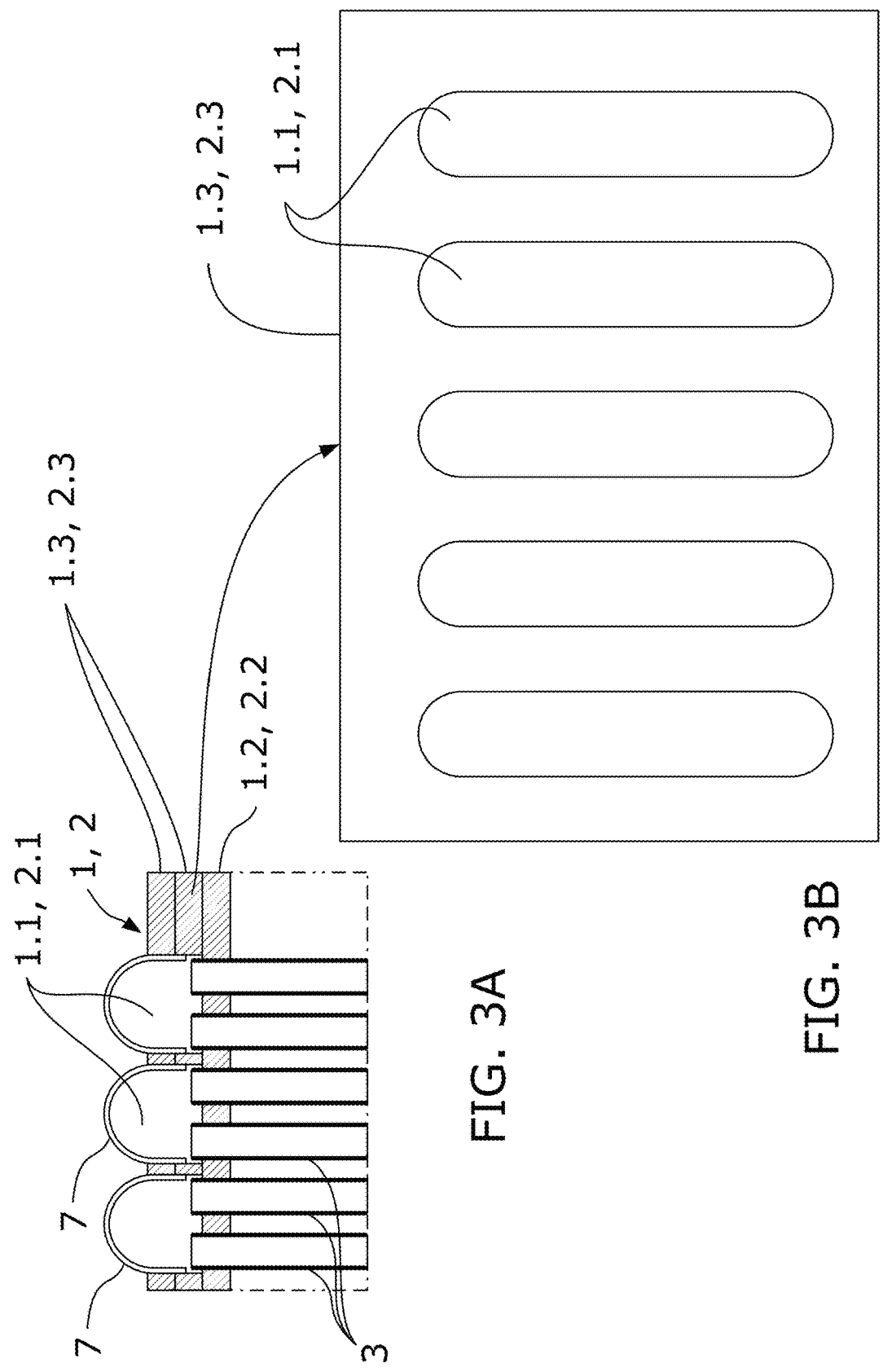

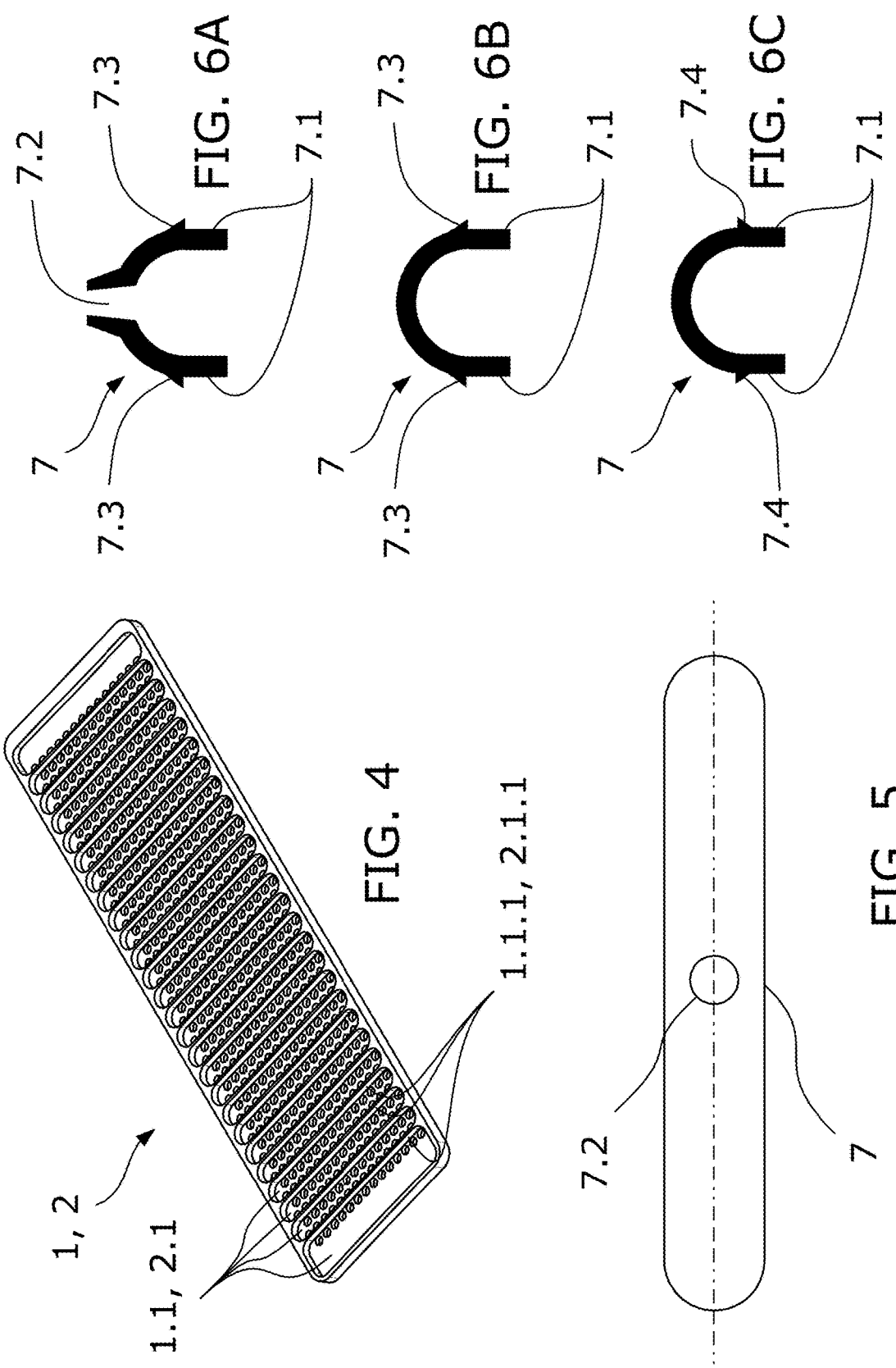

EVAPORATOR

CROSS REFERENCE TO RELATED APPLICATIONS

This application is filed under 35 U.S.C. § 119(a) and claims priority to European Patent Application No. EP15382534.4, filed Oct. 28, 2015 and entitled "Evaporator" in the name of Adrian FOLGUEIRA BALTAR, incorporated herein by reference in its entirety.

OBJECT OF THE INVENTION

The present invention relates to a cross flow evaporator adapted to generate vapor from the heat of the exhaust gases from an internal combustion engine. The evaporator is constituted, among other elements, by two plates spaced from one another which contain chambers. The heat exchange tubes alternately communicate the chambers of both plates, establishing a specific path for the fluid intended to change phases. The tubes extending between the chambers of the two plates are arranged transverse to the flow of the hot gas.

This evaporator is adapted for heat recovery systems using a Rankine cycle, making use of the heat from the exhaust gases.

The invention is characterized by a special configuration of the chambers by means of caps that allow gases to circulate in the manufacturing process, in the brazing process; both the entrance of gases that form the controlled atmosphere of the furnace required in this type of welding and the exit of oxygen harmful for the weld and of the volatile gases generated in the furnace.

BACKGROUND OF THE INVENTION

Heat exchangers are devices intended for transferring heat from a first hot fluid to a second fluid which is initially at a lower temperature.

A specific case of heat exchangers is those exchangers intended for cooling the hot exhaust gas for EGR (Exhaust Gas Recirculation) systems through a coolant liquid. These types of heat exchangers must overcome specific technical problems due to temperature changes in their different components.

The temperature variation ranges go from its resting state, where all the components are at room temperature, to the operative mode, where the inlet gases may reach more than 600 degrees centigrade, producing significant differences in temperature in different parts of the device.

The structure of this type of exchangers is configured as a heat exchange tube bundle through which the hot gas circulates, and this tube bundle is housed in a shell through which the coolant liquid circulates.

If the coolant liquid enters and exits approximately at points of the shell located near the ends of the tube bundle, then the flows of gas and liquid circulate approximately according to parallel directions, whether co-current or counter-current.

Problems caused by thermal expansion are solved by making used of intermediate manifolds, which receive or deliver the hot gas, which in turn have bellows-type structures that compensate for the differential expansion between the tube bundle, in contact with the hot gas, and the shell, in contact with the coolant liquid.

A different type of heat exchanger is that consisting of evaporators. Evaporators are heat exchangers designed to transfer the heat of a hot gas to a liquid that is not only heated up but also changes phase.

The technical challenges presented with an evaporator are greater than those of a heat exchanger such as the one described at the beginning of this section. The phase change allows differentiation of three steps in connection with the temperature and the state of the liquid changing phase:
  i. step of heating the liquid to be evaporated;
  ii. step of phase change;
  iii. step of overheating.

The first and second steps occur at not very high temperatures, since the phase change temperature establishes a barrier which prevents raising the temperature above the evaporation temperature. In contrast, the overheating step is not limited by the phase change and may raise the temperature up to values close to maximum temperature values for the hot gas.

The inlet temperature conditions of the two fluids, the hot gas that transfers its heat and the liquid intended for changing phase, are not always the same and neither are the inlet flow rates. The variation of these variables makes the interphase between the first and second step, and the interphase between the second and third step, not occur in the same place inside the evaporator, in connection with the path of the liquid intended for changing phase inside the device, rather it can occur in different places within a certain interval of said path.

Additionally, going from liquid to vapor and going from the mixture of liquid and vapor to superheated vapor is not instantaneous, so no precise place may be identified where the division is established between steps, rather such divisions are in a specific segment.

Each of the steps has different heat exchange conditions. The heat transfer coefficients between the surface of the heat exchange tube and the liquid (step i) are very different from those of a two-phase flow, i.e., the flow formed by liquid plus vapor (step ii), and very different from the heat transfer coefficient of the superheated vapor (step iii).

Not only are the heat transfer coefficients different, but the specific volume in the liquid is very low with respect to the specific volume in the liquid-plus-vapor mixture, and this in turn is low with respect to the specific volume of vapor when the temperature thereof is rising.

All these very different factors between the three steps make the design variables different and the evaporator have technical difficulties that a heat exchanger with no phase change does not show, above all when the evaporator must be compact and occupy the smallest possible space.

Compact heat exchangers are known that are designed to act as evaporators in heat recovery systems in internal combustion engines for impulsion of vehicles. These evaporators increase the heat exchange surface by arranging a tube bundle comprising a bundle of pairs of coaxial tubes. The liquid intended for changing phases passes through the space between the pair of coaxial tubes and the hot gas passes through both inside the inner tube and outside the outer tube.

The fluid changing phase passes between two hot surfaces with little distance between them so that the raising of the temperature and the subsequent phase change takes place within a length of the pair of coaxial tubes that is shorter than if only one tube for circulating the fluid changing phase therein and the hot gas on the outside thereof, were used.

With this configuration one of the problems that exists is that the three heat exchange steps take place throughout the same tubes, so the design of the exchanger cannot be optimized for the three steps at the same time.

As an example of this difficulty, the speed of the inlet flow in liquid phase may be very low due to the low value of the specific volume, while at the outlet, the same liquid flow rate corresponds to a much larger volume of vapor, which imposes much higher speed values than those of the liquid inlet.

Low speed at the inlet can lead to the deposition of dirt and the high speed of the vapor at the outlet can generate excessive pressure drops.

The present invention avoids these problems by using a cross-flow configuration between the hot gas and the fluid changing phase.

The evaporator is constituted, among other elements, by two plates spaced from one another which contain chambers. The heat exchange tubes alternately communicate the chambers of both plates.

The hot gas flows between the plates, parallel to both, in a volume closed by side walls. With this configuration, the exchange tubes are transverse to the flow. The length needed to obtain the vapor at a specific temperature is attained by incorporating the number of tubes needed to reach the length which allows for sufficient heat transfer and therefore cover the three steps.

Expansion of a heat exchange tube depends on the thermal expansion coefficient of the material and on the total length of the tube. With the configuration of the device according to the invention, each of the individual tubes extending between both plates is much shorter than the total length of the path, so the effect of expansion is noticeably reduced.

Another advantage that this configuration has is the possibility of communicating two chambers with more than one heat exchange tube in such a way that, after a phase change takes place, the chambers between which the fluid is being transferred can be communicated with a growing number of tubes. The growing number of tubes is equivalent to an increase in the passage section, and the device thereby takes into account the increase in the specific volume with the phase change, thereby succeeding to lower the speed and thus also the pressure drop.

However, in spite of these advantages, the path that the fluid changing phase follows is more meandering compared to evaporators in which those tubes are parallel to the flow of hot gas, and it has a specific number of intermediate chambers.

The problem set forth by this configuration is the manufacturing thereof, using brazing, since during the passage through the furnace, the gases of the furnace atmosphere, suitable for obtaining good welding, specifically brazing, are not capable of invading the inside of the chambers and the tubes reaching the areas in which the brazing paste is located, above all in those intermediate chambers located in intermediate areas of the path for being spaced from both the inlet and the outlet. Likewise, the oxygen that is inside the evaporator before being introduced in the furnace must be removed, as well as the volatile elements which are formed when the temperature of the brazing paste increases.

The present invention solves this problem by incorporating caps allowing the manufacturing with openings for the easy circulation of gases, i.e., both the entrance of gases from the controlled atmosphere of the brazing furnace and the exit of oxygen and volatile elements, without affecting the advantages this construction provides by means of plates.

DESCRIPTION OF THE INVENTION

As indicated at the end of the preceding section, a first aspect of the invention is an evaporator for the evaporation of a first fluid by means of the heat provided by a second fluid, the second fluid being a hot gas.

According to a preferred example, as will be described below, the fluid intended for changing phase is ethanol, an alcohol, and the hot gas is the exhaust gas of an internal combustion engine. One very useful application is the use of the evaporator in a Rankine cycle to recover the heat from the exhaust gases in the form of mechanical energy which would otherwise end up being discharged into the atmosphere.

The evaporator comprises:

a first plate and a second plate facing one another and arranged spaced from one another, defining an inner face, the face facing the other plate, and an outer face opposite the inner face; wherein each of the plates comprises a plurality of chambers;

an intake manifold of the first fluid and an exhaust manifold of the first fluid located in fluid communication with one another and with at least one different chamber of any of the plates;

a plurality of heat exchange tubes wherein each of the heat exchange tubes extends between a chamber of the first plate and a chamber of the second plate; wherein each chamber of a plate is in fluid communication with two or more chambers of the other plate by means of at least two heat exchange tubes, except the chambers in fluid communication with the intake manifold or the exhaust manifold;

there being for each of the heat exchange tubes a path of fluid communication from the intake manifold to the exhaust manifold passing through the interior of said heat exchange tube;

two side walls extending between the first plate and the second plate housing the plurality of heat exchange tubes and establishing between both a space for the passage of the second fluid, wherein the second fluid enters through an inlet and exits through an outlet;

The flow of the second fluid, the hot gas, is established between an inlet and an outlet throughout a space delimited by the two plates and by the two side walls. In the preferred configuration the two plates are parallel to one another and the walls are also parallel to one another and perpendicular to the two plates. A prism with rectangular bases is defined with this configuration.

The heat exchange tubes extend between the chambers of both plates, crossing the inner space delimited by the plates and the walls. The arrangement of the exchange tubes with respect to the main flow of the second fluid is transversal.

The exchange tubes alternately transfer the flow of the first fluid from one chamber of the first plate to another chamber of the second plate. A first chamber is communicated with an intake manifold of the first fluid.

The passage from one chamber located in the first plate to the chamber located in the second plate, or vice versa, is made through the exchange tubes. The exchange tubes are located crossing the flow of the second fluid, i.e., the hot gas. It is in this passage through the exchange tubes where the second fluid transfers its heat to the first fluid.

The last chamber is communicated with an exhaust manifold that collects the first fluid in superheated vapor phase, and takes it to the conduit which leads it to the application for which it is intended.

The first fluid entrance is in liquid phase with a reduced specific volume. The necessary liquid flow can be transported by means of one or a few exchange tubes. Therefore, the first chambers of both plates are connected through one or several heat exchange tubes.

Once the first step of raising the temperature of the liquid has passed, the phase change begins where the appearance of vapor increases the specific volume. After a specific chamber, i.e., the chamber where the second step is expected to begin, the number of heat exchange tubes communicating one chamber with the next chamber of the other plate is higher, giving rise to an increase in the passage section which compensates said increase in the specific volume, reducing the speed and pressure drop.

According to preferred examples of the invention, the consecutive arrangement of the chambers is ordered according to the direction of movement of the second fluid, i.e., the hot gas, where transverse paths can also be drawn in a zigzag configuration, depending on the width of the evaporator. The assembly of exchange tubes is therefore arranged in a very compact and orderly manner, and said order does not prevent increasing the number of tubes per chamber.

With this configuration, the first fluid enters a first chamber through the intake manifold. From this first chamber it passes to another chamber of the opposite plate through one or more heat exchange tubes. This first fluid alternately passes from chambers of one plate to chambers of the other plate, being able to increase the number of heat exchange tubes communicating one chamber to another to compensate the increase in specific volume due to the phase change. Once the last chamber is reached, this chamber is in fluid communication with the exhaust manifold which discharges the first fluid in the form of superheated vapor.

Additionally, the evaporator verifies that:

at least one of the chambers is a cavity which is open through the outer face and is closed by means of a cap attached to said chamber.

Manufacturing the evaporator entails a step of assembling the components in their final position: mainly the plates, the walls and the exchange tubes, where brazing paste has been incorporated on the contacting surfaces of the parts to be attached.

The welding of the parts is achieved by passing the set of parts through a furnace, where the metal of the brazing paste melts, attaching the surfaces in contact. This melting must be done in a controlled atmosphere. Examples of a controlled atmosphere are those that make use of a reducing atmosphere, mainly formed by hydrogen and nitrogen, or they are vacuum welded. The vacuum atmosphere helps to extract oxygen from inside the device to be welded.

The atmosphere of the furnace is a reducing atmosphere, and it flows easily into the space intended for the passage of the second fluid, i.e., hot gas, with the heat exchange tubes crossing this space because the space is large.

In contrast, the reducing or vacuum atmosphere of the furnace have suitable access to the first chambers and the first welds between the bases of the chambers and the heat exchange tubes that are attached to them; but the remaining chambers require a meandering passage that prevents the atmosphere of the furnace from reaching inner areas.

Likewise, volatile elements migrating into the chambers of the plates and into the heat exchange tubes run into a path equal to the length of the path imposed by the evaporator up to either the inlet or outlet manifolds of the first fluid.

Particularly, the welding areas located at the midpoint of the path require passing through all the chambers and heat exchange tubes existing up to the manifolds, where this path can be half of the path imposed by the evaporator for the first fluid. This path is very long for circulating gases. The lack of access of the reducing or vacuum atmosphere, or the difficulty in discharging the oxygen and volatile elements generated means that the welds are contaminated, or are not formed correctly.

The result is defective welding that may even not seal the two surfaces.

The invention solves the problem by defining at least one open chamber through the outer face of the plates. This open chamber is preferably located in the intermediate area of the path. It does not necessarily have to be in the central position because the increase in the number of heat exchange tubes in chambers located towards the end of the path makes that the smaller section of passage is produced in chambers that are located at the beginning of the path of the first fluid.

According to several embodiments, all the chambers are open and have caps.

The caps can subsequently be welded once the remaining parts have been welded with the passage through the furnace using any welding technique, such as brazing, TIG, MIG, laser, etc.

The invention provides additional advantages because it also allows a simple configuration of the chambers. The chambers are closed cavities, except the fluid connections established, for example, by the exchange tubes. The closed configuration makes production thereof difficult.

As will be described in the examples, the plates allow production by means of stacking of die-cut metal sheets. Therefore, the chambers are built by attaching die-cut metal sheets that give rise to open cavities that in turn are closed with the caps. A plurality of caps can be welded by means of brazing during passage through the furnace and one or more cavities can be left open to allow the circulation of gases and volatile elements.

According to other embodiments, one or more caps have ventilation openings. This opening allows all the caps to be welded during passage through the furnace in which the remaining components of the evaporator are welded. Once the parts are welded by brazing, including the caps, the openings are closed either by means of a plug or with another type of welding, assuring closure of the chambers including the ventilation opening.

DESCRIPTION OF THE DRAWINGS

These and other features and advantages of the invention will be better understood based on the following detailed description of a preferred embodiment, given solely by way of illustrative, non-limiting example in reference to the attached drawings.

FIG. 3A shows a detail of a schematic section of another embodiment that allows seeing a constructive feature of the plate, manufactured by means of stacking of die-cut plates, in which the chambers are configured.

FIG. 3B shows a top view of an embodiment of one of the die-cut metal sheets giving rise to one of the main plates of the evaporator.

FIG. 4 shows a perspective view of one of the plates according to another embodiment, in which the chambers are configured.

FIG. 5 shows a top view of another embodiment of the cap seen from its outer portion.

FIGS. 6A, 6B and 6C show section views of different examples of caps. FIG. 6A shows a section view of a cap with a ventilation opening, where the section passes through said opening. FIGS. 6B and 6C show section views of caps without the ventilation opening and with outer projections with various functions.

DETAILED DESCRIPTION OF THE INVENTION

According to the first inventive-aspect, the present invention relates to an evaporator intended for transferring the heat from a hot gas to a liquid, which raises its temperature, changes phase and exits as superheated vapor.

In the embodiments, the hot gas, the one identified as second fluid, is the exhaust gas of an internal combustion engine. In these embodiments, the first fluid is ethanol. Ethanol enters in liquid phase inside the evaporator. The transfer of heat from the second fluid to the first fluid results in a first step where the temperature of the first fluid raises until reaching the boiling temperature; in a second step it changes phase, maintaining the temperature about equal to the boiling temperature; and in a third step, in the vapor phase the temperature further increases.

In this embodiment, the superheated ethanol vapor is used in a Rankine cycle to generate mechanical energy recovering part of the heat from the exhaust gases of the internal combustion engine.

Figure 1:
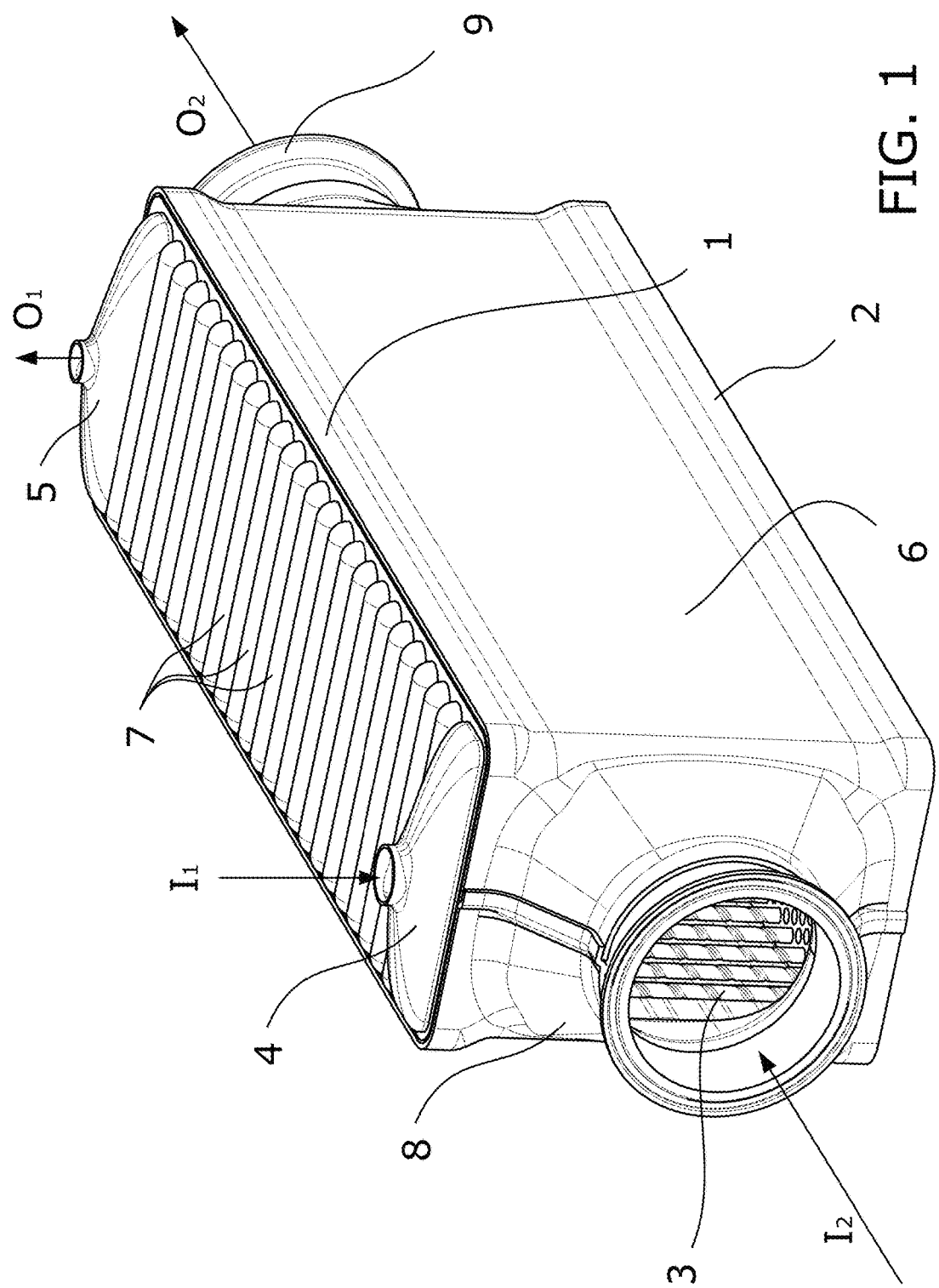
FIG. 1 shows a perspective view of an embodiment of the invention. In this figure, some heat exchange tubes have been intentionally removed from the inside for greater clarity.
Figure 2:
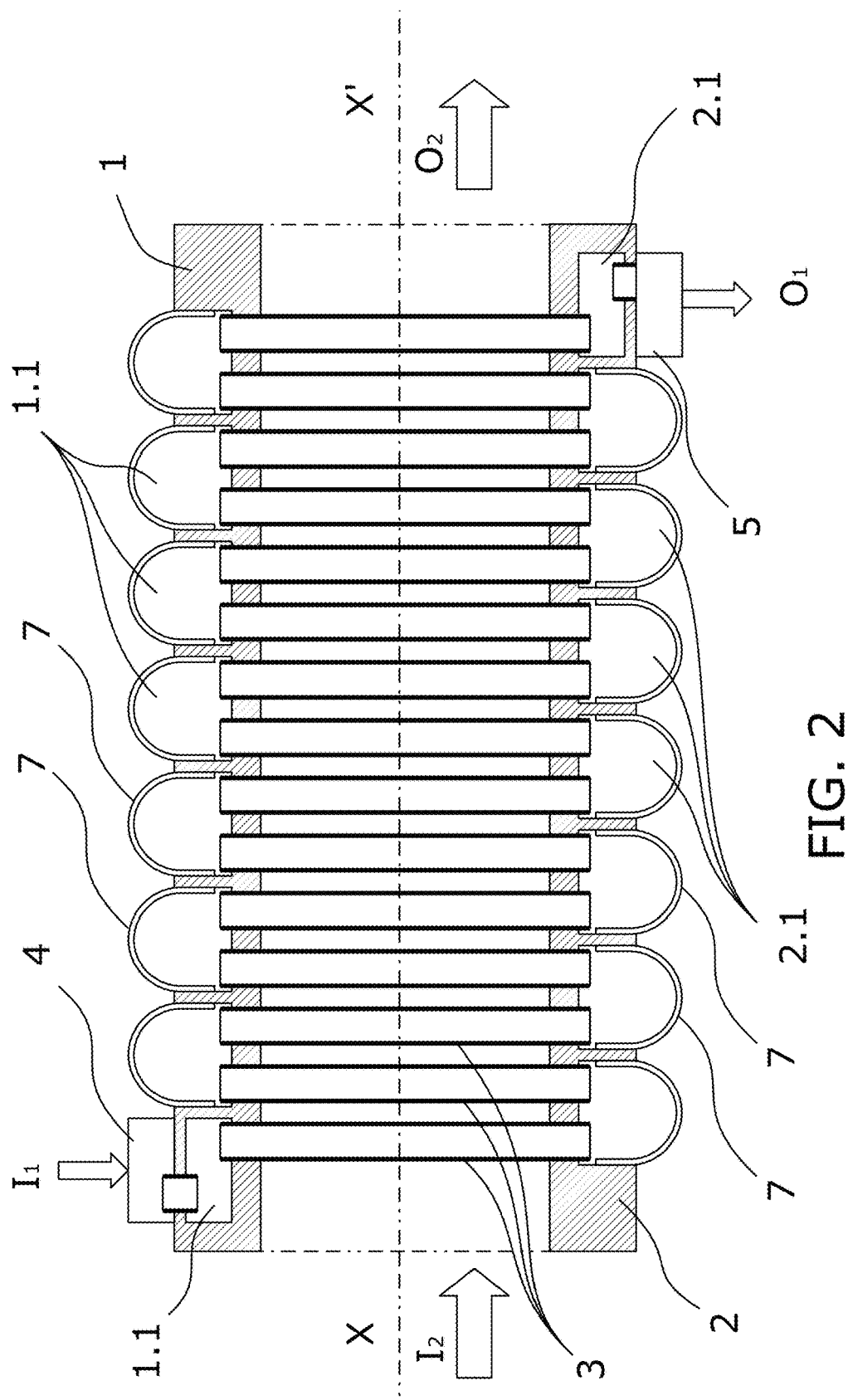
FIG. 2 shows a schematic section view of another embodiment of the invention that allows seeing the inside of the evaporator, of the two plates and of some of the chambers, as well as the exchange tubes going from one plate to the other. In this embodiment, unlike the preceding embodiment, the exhaust manifold of the first fluid is formed in the opposite plate.

As shown in FIGS. 1 and 2, according to embodiments of the invention, the evaporator is formed by two plates (1, 2) of rectangular configuration, with two longer sides and two shorter sides, spaced from and parallel to one another. In the figures, the parallel plates (1, 2) are depicted as being horizontal up and down according to the orientation of the figures.

The longer sides of the plates (1, 2) are connected by means of respective side walls (6) in the form of a flat plate that limit a prismatic-shaped internal volume with essentially rectangular bases. These side walls (6) are the walls depicted as being vertical in FIG. 1.

The shorter sides of the plates correspond to the ends of the evaporator where the inlet ($I_2$) for the second fluid is located, and the outlet ($O_2$) is located at the opposite end. The direction of the second fluid establishes a longitudinal direction identified as X-X' in FIG. 2.

Each of the plates (1, 2) has a plurality of chambers (1.1, 2.1). Exchange tubes (3) extend from one chamber (1.1, 2.1) of a plate (1, 2) to another chamber (1.1, 2.1) of the other plate (1, 2). The heat exchange tubes (3) are arranged transverse to the flow of the second fluid; i.e., transverse to the longitudinal direction X-X'.

Each chamber (1.1, 2.1) has exchange tubes (3) such that it is in fluid communication with two or more chambers (1.1, 2.1) of the other plate (1.2). The chamber receives the first fluid through the exchange tubes (3) coming from a chamber (1.1, 2.1) of the other plate (1, 2) and the fluid exits towards the other chamber of the other plate (1, 2) through the other exchange tubes (3) connecting them.

FIG. 2 schematically depicts this condition by offsetting the chambers (1.1) of the first plate (1) and the chambers (2.1) of the second plate (2) according to the longitudinal direction X-X'.

By means of this connection of the chambers (1.1, 2.1), the first fluid passes through the chambers sequentially, crossing from one plate (1, 2) to another through the exchange tubes (3).

According to the section view depicted in FIG. 2, the flow of the first fluid follows a zigzag path, alternating between the first plate (1) and the second plate (2), moving from left to right. Nevertheless, there can be additional chambers (1.1, 2.1) according to the transverse direction which are prolonged according to the direction perpendicular to the plane of the paper, as depicted in FIG. 2, such that the path can also alternate between the first plate (1) and the second plate (2), following a zigzag path, before passing to the next chamber (1.1, 2.1) according to the direction X-X'.

Another option that allows increasing the volume of flow that is conveyed is to use two or more rows of tubes in the communication between two chambers.

The heat exchange tubes (3) are distributed inside the prismatic volume defined by the plates (1, 2) and the side walls (6) with an orientation transverse to the direction of the main flow of the second fluid. The path followed by the first fluid in the path, alternating between the first plate (1) and the second plate (2), will depend on how the chambers (1.1, 2.1) of both plates (1, 2) are overlapping, overlap being understood as that obtained by means of a projection according to the direction perpendicular to any of the main planes of the plates (1, 2). The chambers (1.1, 2.1) between which the passage of the first fluid in the first plate (1) and in the second plate (2) is alternated are shown as being consecutively overlapped according to a projection in the direction perpendicular to both plates (1, 2).

Said FIG. 2 shows a first chamber (1.1) of the first plate (1) in fluid communication with an intake manifold (4). The path of the first fluid ends in a last chamber (2.1) of the second plate (2) in fluid communication with a second outlet manifold (5).

In the example shown in FIG. 1 the inlet manifold (4) and outlet manifold (5) are in the same plate (1), whereas in the example shown in FIG. 2 they are in different plates (1, 2).

In the embodiment of FIG. 2, the plates (1, 2) have chambers (1.1, 2.1) configured by means of machining. The machining of the chambers (1.1, 2.1) gives rise to slots such as those shown in FIG. 4. In FIG. 2, the heat exchange tubes (3) are depicted as being parallel and in FIG. 4, the holes that receive the exchange tubes (3) are offset, leaving a staggered distribution.

Each of the slots is closed with a cap (7), configuring the corresponding chamber (1.1, 2.1) therein. According to one embodiment, the caps (7) are obtained in a single part by machining, whereas in the examples shown in FIGS. 2, 3A, 5, 6A, 6B and 6C, the caps are configured from a stamped and die-cut metal sheet.

The detail of FIG. 3A shows an alternative way of configuring the main plates (1, 2) of the evaporator. Each of the main plates (1, 2) is in turn formed by a first elemental plate (1.2, 2.2) having perforations to allow for the passage of the ends of the heat exchange tubes (3), and a second elemental, die-cut plate (1.3, 2.3) with perforations to configure the chambers (1.1, 2.1), the first elemental plate (1.2, 2.2) and the second elemental plate (1.3, 2.3) being attached to one another.

In this particular example, to limit the thickness of the plate to be die-cut, two identical die-cut plates have been used, and once stacked form the second elemental plate (1.3, 2.3). The desired thickness, or in other words, the height of the chamber (1.1, 2.1) formed by the perforations, can be obtained by stacking a plurality of plates (1.3, 2.3).

FIG. 3B shows a second die-cut plate (1.3, 2.3) with the perforations giving rise to the chambers (1.1, 2.1).

In the described examples, whether the slots are formed by a machining operation on the plate (1, 2) or are obtained by stacking second die-cut plates, the inner walls of the slots (1.1.1, 2.1.1) are perpendicular to the main plane of the plate (1, 2).

When the caps (7) are manufactured by means of die-cutting and stamping the side walls of the caps (7) are parallel to one another and are tightly fit against walls of the chambers (1.1, 2.1). The attachment by means of brazing of the caps through these walls arranged perpendicular to the caps (1, 2) has the advantage that the internal pressure when the evaporator is in the operative mode applies a force on the inner side of the cap (7), with a resultant force that tends to remove the cap. This resultant force is parallel to the surfaces attached by brazing, and the stresses generated are shear stresses. Welding by brazing is suitable for absorbing these shear stresses, increasing the service life of the evaporator.

The caps (7) are elongated and configured according to a main direction. FIG. 5 shows a top view of a plug (7), with the described vertical walls even though they are not seen in this top view, and an elongated configuration with rounded ends. The elongated configuration extends according to a main direction which, in this figure, is identified by means of a discontinuous line. This cap (7) is suitable for closing the open cavities seen in FIG. 4, giving rise to the chambers (1.1, 2.1).

FIGS. 6A, 6B and 6C show sections according to a plane transverse to the main direction of the cap (7). According to this cross-section, the vertical walls are prolonged by means of a semicircumferential arc giving rise to a configuration of the caps (7) with elongated dome-shape. This appearance is clearly shown in FIG. 1, in the upper portion of the evaporator, where a plurality of caps (7) are distributed parallel to one another and transverse with respect to the main direction of the evaporator X-X'. This distribution corresponds to the distribution of chambers (1.1, 2.1) shown in FIG. 4.

In the operative mode, the phase change of the first fluid increases its specific volume, and since it is confined, pressure increases inside the chambers (1.1, 2.1) and also inside the caps (7). The semicircumferential arc shape allows the cap to support the pressure without generating bending stresses in the portions of the surface that are not attached by welding. This condition, the absence of bending stresses, allows using minimal thickness in the caps (7).

The transverse arrangement of the chambers (1.1, 2.1) with respect to the longitudinal direction of the evaporator makes bending of the plate according to a direction parallel to the main plane of the plate and transverse to the longitudinal direction X-X' easier. Although FIG. 4 does not show the longitudinal direction X-X', it is the direction that corresponds to the direction of any of the longer sides of the plate (1, 2).

The distribution of the chambers (1.1, 2.1) in the first and second plate (1, 2) corresponds to a direction of movement of the flow of the first fluid according to the longitudinal direction. The temperature of this fluid is lower at the inlet that at the outlet such that the differential expansion of the heat exchange tubes (3) makes the plates (1, 2) be forced to bending. The transverse arrangement of the caps (7) makes elastic deformation of the plates in response to the stresses imposed by these differential expansions easier.

The manufacturing of the evaporator is performed with an assembly of all its components incorporating brazing paste in all those places where welding is required. The sinuous path imposed by the heat exchange tubes (3), alternating the fluid connection of chambers (1.1) of the first plate and chambers (2.2) of the second plate (2.2), complicates both the entrance of the reducing atmosphere of the furnace and the exit of the volatile elements that are generated in the furnace by the evaporation of part of the components of the brazing paste and the internal oxygen.

The caps (7) allow being subsequently included in at least one of the chambers (1.1, 2.1). The subsequent inclusion requires a second welding operation that does not necessarily have to be by brazing.

FIG. 5 shows a ventilation opening (7.2). With this ventilation opening (7.2), it is possible to include all the caps (7) in the chambers (1.1, 2.1) before the evaporator passes through the furnace to achieve welding by brazing. The volatile elements exit through the openings (7.2), preventing the increase in internal pressure.

Once the caps (7) are welded, the openings are closed with either a weld point or a weld bead or with a plug, assuring tightness of the chamber (1.1, 2.1) closed by the cap (7).

As indicated above, FIG. 6A shows the cross-section of a cap (7) with a ventilation opening (7.2) in the upper portion thereof.

FIG. 6B shows a section of the cap (7) with an outer projection (7.3) configured to act as a stop on the outer surface of the plate (1, 2). One way of achieving this outer projection (7.3) is by means of punches or projections existing in stamping tools.

FIG. 6C again shows a cap (7) with outer projections (7.4). The configuration of the outer projections (7.3) of FIG. 6B shows a wedge shape favoring support on the outer surface of the plate (1, 2) to act as a stop.

In this FIG. 6C, the orientation of the outer projections (7.4) is opposite and the form of wedge allows the entrance in the slot of the plate (1, 2) giving rise to the chamber (1.1, 2.1) but imposes a friction force against the vertical wall of said slot. Such projections (7.4) favor retaining the cap (7) by friction inside the slot, giving rise to the chamber (1.1, 2.1) when it is closed by means of said cap (7).

The edge defined between the vertical wall of the slot and the outer surface of the plate (1, 2) can have a perimetral projection (not shown in the figure). This recess allows a projection (7.4) like the one shown in FIG. 6C, with wedge shape directed towards the base of the cap (7), to make the entrance in the slot easier; overcoming the perimetral projection of the edge of the slot but, once it is overcome, to prevent the exit thereof. This projection thus configured assures that the caps (7) inserted during the assembly process do not come out until they are welded in the brazing furnace.

The invention claimed is:

1. An evaporator for the evaporation of a first fluid by means of the heat provided by a second fluid, the second fluid being a hot gas, wherein said evaporator comprises:
   a first plate (1) and a second plate (2) facing one another and arranged spaced from one another, wherein each plate has a first face and a second face, wherein the first face of the first plate faces the first face of the second plate; wherein each of the plates has a length and a width and the length is along a longitudinal direction X-X', wherein the first plate (1) comprises a plurality of cavities and the second plate (2) comprises a plurality of cavities, wherein each cavity is open through the second face of their respective plates, said cavities being defined by inner walls (1.1.1, 2.1.1); wherein at least one of said first and second plates is formed by stacking a plurality of flat elemental plates, the plurality of elemental plates including a first elemental plate having perforations to allow for the passage of heat exchange tubes and a second elemental plate having perforations including said inner walls and defining said cavities, the first elemental plate and the second elemental plate being attached to one another;

an intake manifold (4) of the first fluid and an exhaust manifold (5) of the first fluid;

a plurality of heat exchange tubes (3) wherein each of the heat exchange tubes (3) extends between one of the cavities of the first plate (1) and one of the cavities of the second plate (2), wherein each cavity of the first plate (1) is in fluid communication with two cavities of the second plate (2) via the heat exchange tubes (3), and each cavity of the second plate (2) is in fluid communication with two cavities of the first plate (1) via the heat exchange tubes (3), with the exception of one of the cavities of the first plate (1) which is in fluid communication with the intake manifold (4) and only one cavity of the second plate (2) via the heat exchange tubes (3) and one of the cavities of the second plate (2) which is in fluid communication with the exhaust manifold (5) and only one cavity of the first plate (1) via the heat exchange tubes (3);

there being a path of fluid communication from the intake manifold (4) to the exhaust manifold (5) passing through the interior of said heat exchange tubes (3) and the cavities of the first and second plates;

two side walls (6) extending between the first plate (1) and the second plate (2) housing the plurality of heat exchange tubes (3) and establishing between the two side walls and the first and second plate a space for the passage of the second fluid, wherein the second fluid enters through an inlet (I2) and exits through an outlet (O2) along the longitudinal direction X-X'; and wherein each cavity that is not associated with the manifolds (4, 5) is closed by means of a dedicated cap (7) to define a plurality of chambers (1.1, 2.1) in the first and second plates, wherein each cap (7) has cap walls (7.1) such that following insertion of each of the dedicated caps into the corresponding cavity, the cap walls (7.1) are attached to the inner walls of said cavity.

2. The evaporator according to claim 1, wherein the second elemental plate (1.3, 2.3) is a composite plate comprising a plurality of plates stacked on one another.

3. The evaporator according to claim 1, wherein the chambers (1.1) of the first plate (1) are offset relative to the chambers (2.1) of the second plate (2) along the longitudinal direction X-X'.

4. The evaporator according to claim 3, wherein the offset comprises a consecutive overlap of chambers (1.1) of the first plate (1) relative to chambers (2.1) of the second plate (2) according to a projection perpendicular to the longitudinal direction X-X'.

5. The evaporator according to claim 1, wherein the inner walls (1.1.1, 2.1.1) and the cap walls (7.1) of the cap (7) are parallel to one another.

6. The evaporator according to claim 1, wherein at least one of the caps (7) is dome-shaped (7.4) having a semicircular section.

7. The evaporator according to claim 1, wherein at least the first plate (1), the second plate (2) and the heat exchange tubes (3) are welded by means of brazing.

8. The evaporator according to claim 1, wherein at least one of the caps is welded to the corresponding plate by means of brazing.

9. The evaporator according to claim 1, wherein at least one of the caps (7) has a ventilation opening (7.2).

10. The evaporator according to claim 9, wherein the cap(s) having a ventilation opening (7.2) further comprise a weld point or a weld bead or a plug in said ventilation opening (7.2).

11. The evaporator according to claim 1, wherein at least one of the caps (7) comprises outer projections (7.3) adapted to act as a stop when said at least one cap (7) is inserted into its corresponding cavity.

12. The evaporator according to claim 1, wherein at least one of the caps (7) comprises outer projections (7.4) adapted to increase friction with the inner walls (1.1.1, 2.1.1) of the corresponding cavity, and/or to abut with opposing projections located on the inner walls (1.1.1, 2.1.1) of the corresponding cavity.

13. The evaporator according to claim 1, wherein each cap has a longitudinal extent in a direction transverse to the longitudinal direction X-X'.

14. A heat recovery system for internal combustion vehicles comprising an evaporator according to claim 1.

15. The evaporator according to claim 1, wherein each of the chambers has a longitudinal extent in a direction transverse to the longitudinal direction X-X'.

* * * * *